(12) United States Patent
Jahn et al.

(10) Patent No.: US 9,303,640 B2
(45) Date of Patent: Apr. 5, 2016

(54) PISTON PUMP FOR DELIVERING A FLUID, AND ASSOCIATED BRAKE SYSTEM

(75) Inventors: Heiko Jahn, Schwieberdingen (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 635 days.

(21) Appl. No.: 12/681,737

(22) PCT Filed: Sep. 18, 2008

(86) PCT No.: PCT/EP2008/062458
§ 371 (c)(1),
(2), (4) Date: Jun. 1, 2010

(87) PCT Pub. No.: WO2009/043735
PCT Pub. Date: Apr. 9, 2009

(65) Prior Publication Data
US 2010/0284841 A1  Nov. 11, 2010

(30) Foreign Application Priority Data

Oct. 4, 2007  (DE) .......................... 10 2007 047 419

(51) Int. Cl.
| | |
|---|---|
| F04B 53/10 | (2006.01) |
| F04B 53/12 | (2006.01) |
| F04B 53/14 | (2006.01) |
| F04B 1/04 | (2006.01) |
| B60T 8/40 | (2006.01) |

(52) U.S. Cl.
CPC .............. *F04B 53/10* (2013.01); *B60T 8/4031* (2013.01); *F04B 1/0452* (2013.01); *F04B 53/126* (2013.01); *F04B 53/146* (2013.01)

(58) Field of Classification Search
CPC ................... F04B 1/0452; F04B 53/12; F04B 53/125–53/129; F04B 53/143; F04B 53/146; F04B 1/0448; F04B 53/10; B60T 8/4031
USPC .............................. 417/470, 549; 92/248, 422
See application file for complete search history.

(56) References Cited

U.S. PATENT DOCUMENTS

| | | | | |
|---|---|---|---|---|
| 2,444,181 A | * | 6/1948 | Baldwin | .......................... 60/588 |
| 2,521,248 A | * | 9/1950 | Parker | ........................... 277/436 |
| 3,008,781 A | * | 11/1961 | Milster | ........................... 92/245 |

(Continued)

FOREIGN PATENT DOCUMENTS

| | | | | |
|---|---|---|---|---|
| DE | 19747850 A1 | | 2/1999 | |
| DE | 10 2004 037 147.4 | * | 7/2004 | .............. F04B 53/10 |
| WO | WO 2006013142 A1 | * | 2/2006 | ................ F04B 1/04 |

*Primary Examiner* — Devon Kramer
*Assistant Examiner* — Joseph Herrmann
(74) *Attorney, Agent, or Firm* — Maginot, Moore & Beck LLP

(57) ABSTRACT

A piston pump includes a piston assembly having at least one cross bore and a longitudinal bore corresponding to the at least one transverse bore, a cylinder, into which the piston assembly is guided in a longitudinally movable manner, and an inlet valve with a cage element, in which an inlet valve spring and an inlet valve sealing element are disposed, and a corresponding inlet valve seat, which is disposed on the piston assembly. Fluid flows through the longitudinal bore into a compression chamber via the inlet valve. A return spring is disposed in the compression chamber. The cage element has a resilient high-pressure sealing element that is configured to receive radially acting power components, and to effect a seal against a cylinder wall via a radial sealing surface, and in order to effect an axial seal against the piston assembly via an axial sealing surface.

13 Claims, 5 Drawing Sheets

(56) References Cited

U.S. PATENT DOCUMENTS

| | | | | |
|---|---|---|---|---|
| 3,131,611 A | * | 5/1964 | McLaughlin | 92/244 |
| 3,902,405 A | * | 9/1975 | Costarella et al. | 92/192 |
| 3,968,971 A | * | 7/1976 | Mariaulle | 277/561 |
| 6,171,083 B1 | * | 1/2001 | Schuller | 417/549 |
| 6,224,352 B1 | * | 5/2001 | Hauser et al. | 417/313 |
| 6,276,909 B1 | * | 8/2001 | Siegel et al. | 417/549 |
| 6,471,496 B1 | | 10/2002 | Merklein et al. | |
| 8,011,907 B2 | * | 9/2011 | Schepp et al. | 417/549 |
| 2001/0002978 A1 | * | 6/2001 | Siegel et al. | 417/470 |
| 2010/0284841 A1 | * | 11/2010 | Jahn et al. | 417/549 |

* cited by examiner

PISTON PUMP FOR DELIVERING A FLUID, AND ASSOCIATED BRAKE SYSTEM

CROSS-REFERENCE TO RELATED APPLICATION

This application is a 35 USC 371 application of PCT/EP2008/062458 filed on Sep. 18, 2008.

BACKGROUND OF THE INVENTION

1. Field of the Invention

The invention is based on a piston pump for delivering a fluid, which is used in particular in vehicle brake systems.

2. Description of the Prior Art

In vehicles with hydraulic or electrohydraulic vehicle brake systems, such piston pumps are preferably used as return feed pumps, for selectively lowering or raising a brake pressure in the wheel brake cylinders, and as a result the brake pressure in the wheel brake cylinders can be regulated. Such regulation can be performed for instance in an anti-lock brake system (ABS), a traction control system (TC system), and an electronic stability program, and so forth. FIGS. 1 through 3 show a conventional piston pump that is used in a vehicle brake system. As can be seen from FIGS. 1 through 3, a conventional piston pump has a piston assembly 2, which has a first piston element 2.1, with a sealing element 13, and a second piston element 2.2, an inlet valve 5, an outlet valve 6, and a cylinder 8. The inlet valve 5 is embodied as a check valve and includes a cage element 11, in which an inlet valve spring 5.2 and an inlet valve sealing element 5.3 are disposed, and the inlet valve sealing element 5.3 is embodied for instance as a sealing disk, which can cooperate sealingly with a corresponding inlet valve seat 5.1 that is disposed on the second piston element 2.2, and the second piston element 2.2 is connected by non-positive engagement to the cage element 11. The outlet valve 6 is likewise embodied as a spring-loaded check valve and is disposed in a cap element 12. The outlet valve 6 is opened when a pressure in a compression chamber 8 is greater than a spring force, acting on an outlet valve sealing element 6.2 of the outlet valve 6 of an outlet valve spring 6.3, as a result of which the outlet valve sealing element 6.2 is pressed out of an outlet valve seat 6.1 disposed at an outlet opening 8.3 of the cylinder 8.

During an intake stroke of the piston assembly 2, fluid is aspirated radially via a filter sleeve 9 and transverse bores 3 disposed in the first piston element 2.1 and is carried, via the longitudinal bore 4, corresponding to the transverse bores 3, in the second piston element 2.2 and via the opened inlet valve 5 into the compression chamber 8.1, which is disposed in the cylinder 8 between the inlet valve 5 and the outlet valve 6. Once top dead center is reached, the direction of motion of the piston group 2 is reversed, so that the second piston element 2.2 having the inlet valve seat 5.1 is pressed sealingly against the inlet valve sealing element 5.3, via the first piston element 2.1 driven by an eccentric element 14 disposed in an eccentric chamber 15, and the inlet valve 5 is closed. Now, a pressure buildup takes place in the compression chamber 8.1 until such time as the pressure in the compression chamber 8.1 is greater than the spring force of the outlet valve 6, as a result of which the fluid that is under pressure is conducted via an outlet opening 8.3 and the opened outlet valve 6 from the compression chamber 8.1 into an outlet line, not shown.

After bottom dead center is reached, the direction of motion of the piston assembly 2 reverses again, so that the outlet valve 6 closes again, and the intake stroke begins again; a restoring force F2 of a restoring spring 10, disposed in the compression chamber 8.1 and guided by a cylinder wall 8.4, which spring is embodied for instance as a spiral spring with polished end windings and is braced on a cylinder bottom 8.2 and on the cage element 11, acts against the cage element 11 of the inlet valve 5 and thus against the second piston element 2.2, in order to move the piston assembly 2 back in the direction of top dead center. During operation, axial forces Fl and F2, which on the one hand are effected by the eccentric element 14 and introduced via the first piston element 2.1, and on the other are effected by the restoring spring 10 and introduced via the cage element 11, and radial forces F3, which are generated by the prevailing system pressure, therefore act on the second piston element 2.2, which has the inlet valve seat 5.1. The second piston element 2.2 embodied as a valve seat is therefore produced as a stable component, preferably as a metal component, and can be weakened only conditionally by intake bores in the form of transverse bores 3. The transverse bores are therefore made in the first piston element 2.1 resulting in a relatively long in let region embodied as the longitudinal bore 4.

ADVANTAGES AND SUMMARY OF THE INVENTION

The piston pump of the invention has the advantage over the prior art that a cage element, in which an inlet valve spring and an inlet valve sealing element are disposed, as a high-pressure sealing element which is embodied for absorbing for radially acting force components and for sealing off against the cylinder wall via a radial sealing element and for sealing off axially from a piston assembly via an axial sealing face, which piston assembly has at least one transverse bore and a longitudinal bore corresponding to the at least one transverse bore. Since the high-pressure sealing element absorbs the radially acting force components, the piston assembly coupled with the high-pressure sealing element now needs to absorb only the operative axial forces and experiences no further deformation from additional radial forces. This dividing up of the axial and radial force components each to one component advantageously leads to a reduction in component loads with respect to elongation and stress and makes it possible to embody the components with a lower component strength.

The piston assembly includes a first piston element and a second piston element, and an inlet valve seat comprises a wear-resistant material and is disposed on the second piston element, which absorbs axially acting force components. At least one transverse bore corresponding to a longitudinal bore is made in the second piston element, and the elastic high-pressure sealing element seals off axially against the second piston element via the axial sealing face. Since there is no longer a nonpositive engagement between the cage element having the high-pressure sealing element and the second piston element having the inlet valve seat, in contrast to the conventional piston pump, one assembly step is advantageously omitted in the production of the piston pump of the invention. Moreover, stresses between the cage element and the second piston element that occur are reduced by the elimination of the non-positive engagement. From the reduction in tension, the at least one intake bore embodied as a transverse bore and the corresponding longitudinal bore can be placed in the second piston element, and the cage element with the elastic high-pressure sealing element and the second piston element with the inlet valve seat can be made as plastic injection-molded parts. Embodying them as plastic injection-molded parts advantageously enables simple, economical production of the components, and complex shaping is possible. Overall, the piston pump of the invention makes an extreme reduction in the cost for the piston assembly possible and makes assembly easy. Moreover, the piston pump of the invention provides improved intake performance, greater pressure resistance, and an extremely short inlet region.

In a feature of the piston pump of the invention, the radial sealing face can be shaped by a pressure-dictated widening of the high-pressure sealing element. Moreover, the elastic high-pressure sealing element, toward the cylinder wall, can have a radial contact region for receiving and centering an upper end winding of a restoring spring for the piston assembly, which spring is disposed for instance in a compression chamber of the piston pump. The radial contact region can be embodied for instance as a radial receiving groove, which is shaped on the outer edge as a flexible sealing lip and closes off the compression chamber toward the cylinder wall in pressure-tight fashion.

In a further feature of the piston pump of the invention, the first piston element can be loosely coupled to the second piston element. Alternatively, the first piston element can be coupled to the second piston element by positive and/or non-positive engagement. The first piston element is embodied for instance as a cylindrical needle roll and is advantageously available as a mass-produced standard part. Since the transmission of the driving force of an eccentric element is effected via a linear contact with the first piston element, embodied as a solid metal needle roll, preferably as a steel needle roll, wear can advantageously be reduced.

Advantageous embodiments of the invention, described below, and the conventional exemplary embodiments, described above for the sake of better comprehension of the invention, are shown in the drawings. In the drawings, identical reference numerals designate components and elements that perform the same or analogous functions.

BRIEF DESCRIPTION OF THE DRAWING

The invention is described in further detail below in conjunction with the accompanying drawings, in which.

DESCRIPTION OF THE PREFERRED EMBODIMENT

Figure 1:
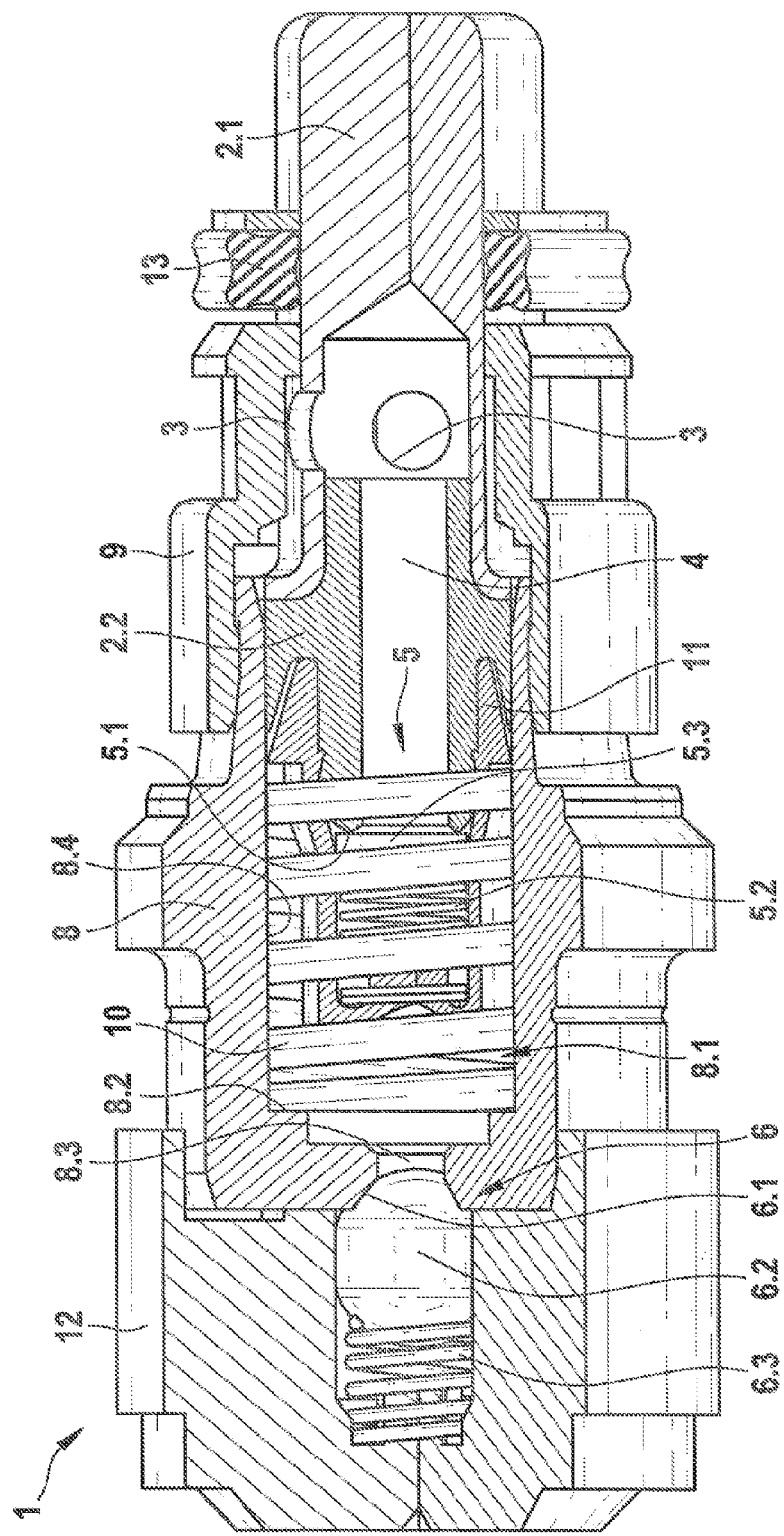
FIG. 1 shows a schematic perspective view of a conventional piston pump.
Figure 2:
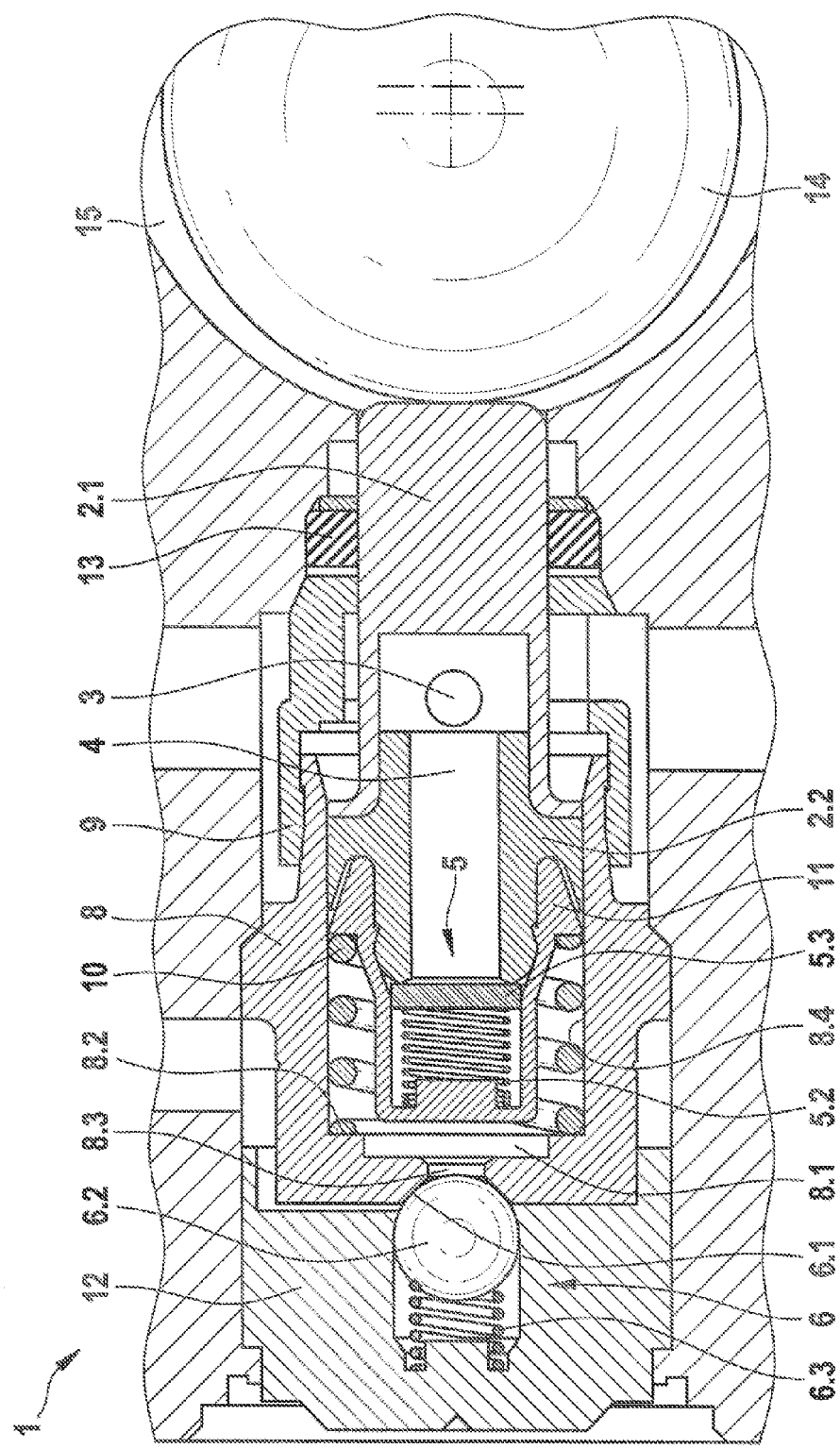
FIG. 2 shows a schematic sectional view of a conventional piston pump.
Figure 3:
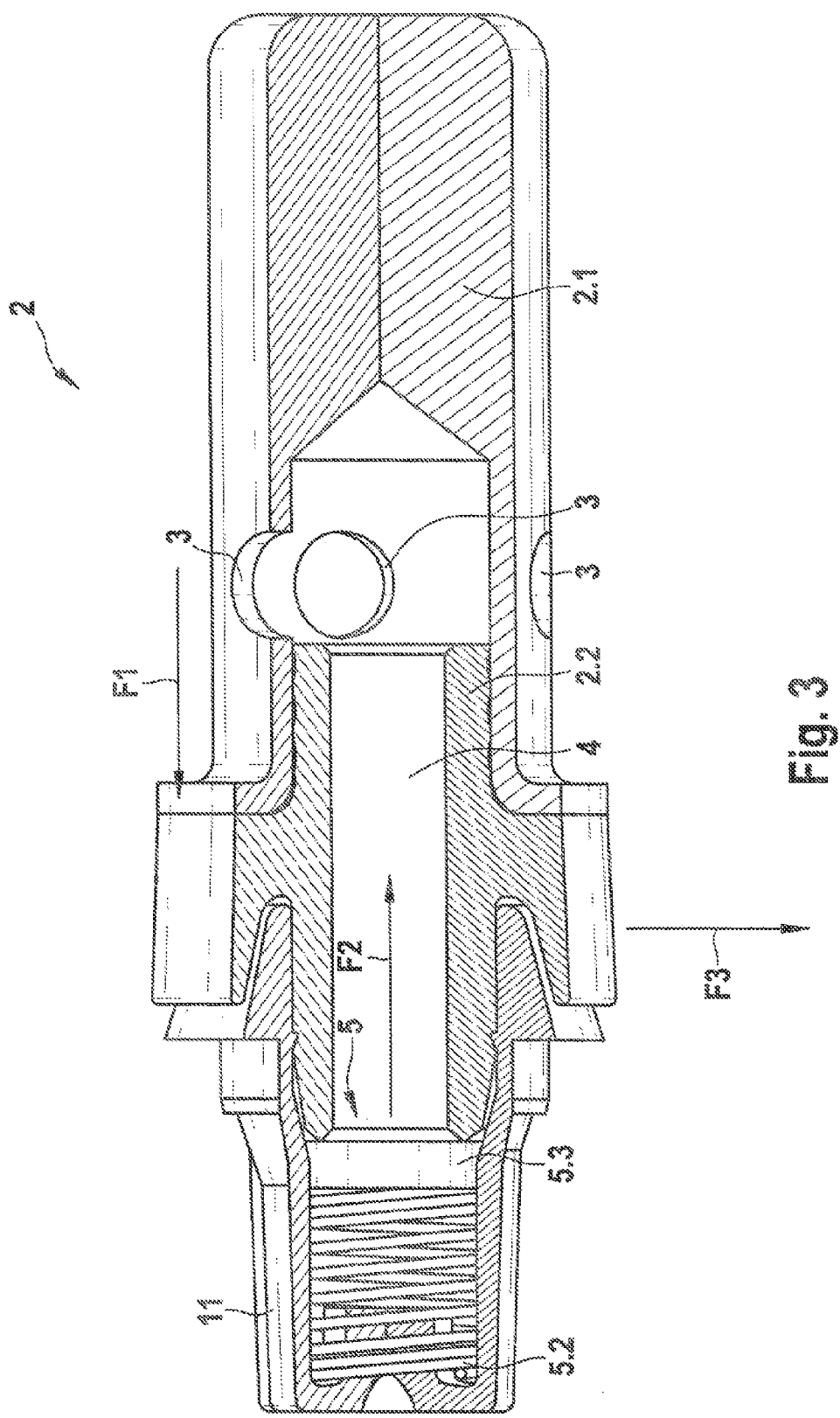
FIG. 3 shows a schematic perspective view of the components of an inlet valve for the conventional piston pump of FIG. 1 or FIG. 2.

A piston pump according to the invention, which can be used as a return feed pump in a vehicle brake system, essentially includes the same components as the conventional piston pump 1 described in conjunction with FIGS. 1 through 3. To avoid text repetition, only the essential differences between the piston pump of the invention and the conventional piston pump 1 of FIGS. 1 through 3 will be described in detail here. In a distinction from the conventional piston pump 1 of FIGS. 1 through 3, the piston pump of the invention includes an improved inlet valve spring in combination with an improved piston assembly.

Figure 4:
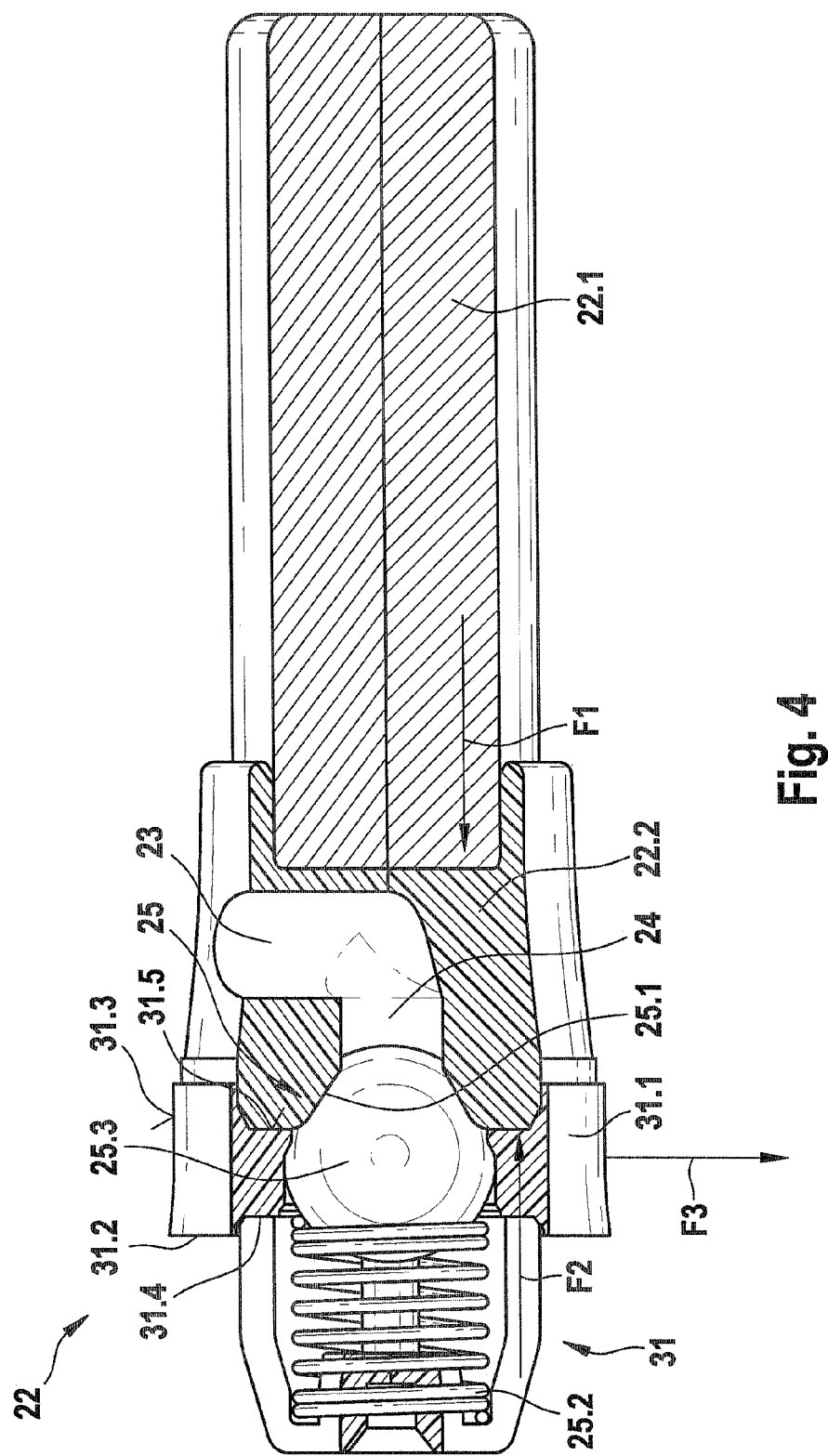
FIG. 4 shows a schematic perspective view of the components of an inlet valve for a piston pump according to the invention.

As can be seen from FIG. 4, the inlet valve 25 of the piston pump of the invention, analogously to the conventional piston pump 1, has a cage element 31, in which an inlet valve spring 25.2 and an inlet valve sealing element 25.3, which is embodied for instance as a sealing ball, are disposed, and also has a corresponding inlet valve seat 25.1, which is disposed on a second piston element 22.2 of a piston assembly 22; the inlet valve sealing element 25.3 can be pressed sealingly into the corresponding inlet valve seat 25.1 by a spring force of the inlet valve spring 25.2. The piston assembly 22 includes a first piston element 22.1, which is embodied here as a cylindrical needle roll, for example, and the second piston element 22.2; the inlet valve seat 25.1 comprises a wear-resistant or hard material. In a distinction from the conventional piston pump 1, the cage element 31 of the piston pump of the invention has an elastic high-pressure sealing element 31.1, which is embodied for absorbing radially acting force components F3 and for sealing off against a cylinder wall 28.4 shown in FIG. 5, via a radial sealing face 31.3, and, via an axial sealing face 31.5, for sealing off axially against the piston assembly 22, or in other words against the second piston element 22.2, which rests on the axial sealing face 31.5.

In a distinction from the conventional piston pump 1, the second piston element 22.2 now absorbs only the axially acting force components F1 and. F2, so that a longitudinal bore 24 and transverse bores 23 that correspond to the longitudinal bore 24 can be made in the second piston element 22.2, without affecting the stability and strength of the second piston element 22.2. In the exemplary embodiment shown, the cage element 31 is embodied with the elastic high-pressure sealing element 31.1, and the second piston element 22.2 and the inlet valve seat 25.1 are both embodied as plastic injection-molded parts, thus advantageously making simple, economical production of the components possible, and complex shaping is also possible. Moreover, the first piston element 22.1, in the exemplary embodiment shown, is solidly coupled to the second piston element 22.2. In an embodiment not shown, the first piston element 22.1 can be loosely coupled to the second piston element 22.2. Overall, the embodiment of the inlet valve 25 according to the invention, in combination with the piston assembly 22, makes an extreme cost reduction for the piston pump possible along with simple assembly. Furthermore, the piston pump of the invention makes improved intake performance and greater pressure resistance available, and, by the dispositions of the transverse bores 23 in the second piston element 22.2, an extremely short inlet region as well.

Figure 5:
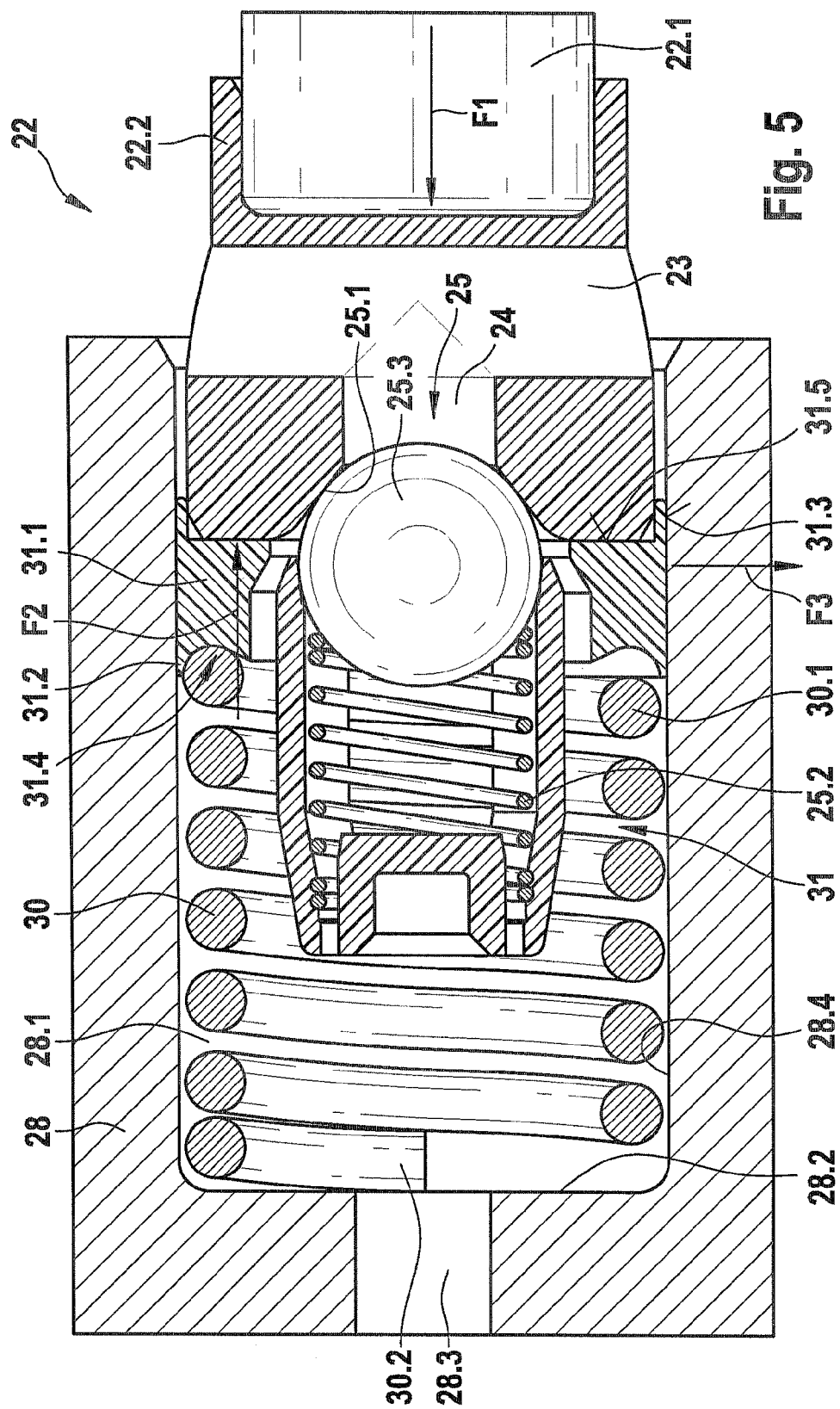
FIG. 5 shows a schematic sectional view of a compression region of a piston pump according to the invention.

As can be seen from FIG. 5, the piston assembly 22 with the inlet valve 25 is guided longitudinally movably in a cylinder 28, and during an intake stroke of the piston assembly 22, fluid is radially aspirated through the transverse bores 23 in the second piston element 22.2 and carried into a compression chamber 28.1 through the open inlet valve 25, via the longitudinal bore 24 that corresponds with the transverse bores 23. After reaching top dead center, the direction of motion of the piston assembly 22 is reversed, so that the second piston element 22.2 with the inlet valve seat 25.1 is pressed sealingly against the inlet valve sealing element 25.3, via the first piston element 22.1 driven by an eccentric element, not shown, and the inlet valve 25 is closed. Now a pressure buildup takes place in the compression chamber 28.1, until such time as the pressure in the compression chamber 28.1 is greater than the spring force of an outlet valve, not shown, as a result of which the fluid under pressure is conducted via an outlet opening 28.3 and the open outlet valve out of the pressure chamber 28.1 into an outlet line, not shown.

After bottom dead center is reached, the direction of motion of the piston group 22 is reversed again, so that the outlet valve closes again, and the intake stroke begins again, and a restoring force F2 of a restoring spring 30, disposed in the compression chamber 28.1 and embodied for instance as a spiral spring, presses against a radial contact region 31.4 that is disposed on the high-pressure sealing element 31.1. The restoring force F2 is axially against the second piston element 22.2 via the high-pressure sealing element 31.1 and the axial sealing face 31.5, and as a result the piston assembly 22 is moved back in the direction of top dead center. The radial contact region 31.4, for instance in the form of a radial receiving groove, is embodied for receiving and centering an upper end winding 30.1 of the restoring spring, and the restoring spring 30 embodied as a spiral spring is braced in this receiving groove with its upper end winding 30.1. Via a lower end winding 30.2, the restoring spring 30 braced on a cylinder bottom 28.2. As can also be seen from FIG. 5, the radial contact region 31.4 is shaped on the outer edge as a flexible sealing lip 31.2, which closes off the compression chamber 28.1 toward the cylinder wall 28.4 in pressure-tight fashion. Since the elastic high-pressure sealing element 31.1 is disposed between the metal restoring spring 30 and the second piston element 22.2 that is made from a wear-resistant and thus harder material, the radial sealing face 31.3 is widened as a result of pressure, so that the high-pressure sealing element 31.1 rests sealingly with its full radial outer diameter on the cylinder wall 28.4. During the compression of the fluid aspirated into the compression chamber 28.1, the high-pressure sealing element 31.1 seals off radially against the cylinder wall 28.4 via the radial sealing face 31.3 and against the second piston element 22.2 by means of the axial sealing face 31.5. In addition, the inlet valve sealing element 25.3 seals off axially against the inlet valve seat 25.1 in the first piston element 22.2.

In the piston pump of the invention, the axial and radial compressive force components are distributed each to a respective component, which advantageously leads to a reduction in component loads with respect to elongation and stress and makes it possible to embody the components with a lower component strength. Overall, the invention makes an economical piston pump, optimized in terms of installation space, possible that has components that are easy to produce and are embodied for instance as plastic injection-molded parts. The piston pump of the invention advantageously has improved suction performance, pressure resistance to 250 bar, and an extremely short inlet region.

The foregoing relates to the preferred exemplary embodiment of the invention, it being understood that other variants and embodiments thereof are possible within the spirit and scope of the invention, the latter being defined by the appended claims.

The invention claimed is:

1. A piston pump, comprising:
   a piston assembly, which includes a piston assembly wall, at least one transverse bore, and one longitudinal bore corresponding to the at least one transverse bore;
   a cylinder, including a cylinder wall in which the piston assembly is guided longitudinally movably; and
   an inlet valve, which includes a cage element in which an inlet valve spring and an inlet valve sealing element are disposed, and which includes a corresponding inlet valve seat, which is disposed on the piston assembly, wherein
   the inlet valve sealing element is configured to be pressed sealingly by a spring force of the inlet valve spring into the corresponding inlet valve seat in order to close the longitudinal bore; and via the at least one transverse bore disposed in the piston assembly, fluid can be aspirated that can be conducted through the longitudinal bore via the inlet valve into a compression chamber in which a restoring spring for the piston assembly is disposed, and wherein
   the cage element has an elastic high-pressure sealing element which absorbs radially acting force components and which seals off radially against the cylinder wall via a radial seal, the radial seal including:
     a first radial sealing face having a full radial outside diameter including a substantially planar surface extending longitudinally along the entire longitudinal extent of the sealing element and configured for full surface contact with the cylinder wall along the entire longitudinal extent of the sealing element, and
     a second radial sealing face having a full inside diameter including a substantially planar surface extending longitudinally and configured for full surface contact with the piston assembly wall,
   the high-pressure sealing element further including:
     an axial sealing face extending radially inward from said radial seal which seals off axially against the piston assembly, and
     a radial contact region disposed toward the cylinder wall, the radial contact region being configured for receiving and centering an upper end winding of the restoring spring;
   wherein said second radial sealing face extends longitudinally from said axial sealing face toward said piston assembly,
   wherein said first radial sealing face extends longitudinally beyond said second radial sealing face, and
   wherein the radial seal is configured to and formed of a material adapted to be widened radially between the first radial sealing face and the second radial sealing face, so that the first radial sealing face is in full surface contact with the cylinder wall and the second radial sealing face is in full surface contact with said piston assembly wall, at least partly by a longitudinal pressure acting on the high-pressure sealing element resulting from contact of the high-pressure sealing element with the piston assembly due to spring force of the restoring spring.

2. The piston pump as defined by claim 1, wherein the piston assembly includes a first piston element and a second piston element, and the inlet valve seat comprises a wear-resistant material and is disposed on the second piston element, and the second piston element absorbs axially acting force components, and the at least one transverse bore corresponding with the longitudinal bore is made in the second piston element, and the elastic high-pressure sealing element seals off axially from the second piston element via the axial sealing face.

3. The piston pump as defined by claim 2, wherein the first piston element is loosely coupled to the second piston element.

4. The piston pump as defined by claim 3, wherein the first piston element is embodied as a cylindrical needle roll.

5. The piston pump as defined by claim 2, wherein the first piston element is coupled to the second piston element by positive and/or nonpositive engagement.

6. The piston pump as defined by claim 5, wherein the first piston element is embodied as a cylindrical needle roll.

7. The piston pump as defined by claim 1, wherein the radial contact region is embodied as a radial receiving groove, which is shaped on the outer edge as a flexible sealing lip, which closes off the compression chamber in pressure-tight fashion toward the cylinder wall.

8. The piston pump as defined by claim 1 wherein the cage element, having the elastic high-pressure sealing element, and the piston assembly, having the inlet valve seat, are embodied as plastic injection-molded parts.

9. The piston pump as defined by claim 1, wherein the cylinder wall defines a cylinder diameter and the piston assembly wall defines a piston diameter less than the cylinder diameter to define a longitudinal space extending longitudinally along the cylinder and between the cylinder wall and the piston assembly wall such that the radial seal completely fills at least a first portion of the longitudinal space when the first radial sealing face is in contact with the cylinder wall and the second radial sealing face is in contact with the piston assembly wall.

10. The piston pump as defined by claim 9, wherein the radial seal extends along the longitudinal space a predetermined distance such that a second portion of the longitudinal space between the cylinder wall and the piston assembly wall is not filled by the radial seal.

11. The piston pump as defined by claim 10, wherein the piston diameter of the piston assembly wall is the same along the first portion and the second portion.

12. The piston pump as defined by claim 1, wherein the cylinder wall defines a cylinder diameter and the piston assembly wall defines a piston diameter less than the cylinder diameter to define a longitudinal space extending longitudinally along the cylinder and between the cylinder wall and the piston assembly wall such that the radial seal completely fills a first portion of the longitudinal space when the first radial sealing face is in contact with the cylinder wall and the second radial sealing face is in contact with the piston assembly wall; and the radial seal does not fill a second portion of the longitudinal space.

13. The piston pump as defined by claim 12, wherein:
the radial contact region is in the form of a radial annular receiving groove; and
the upper end winding of the restoring spring is configured to be received within the radial annular receiving groove and an outer longitudinally disposed surface of the upper end winding is in full surface contact with the radial contact region.

* * * * *